A. H. CARYL.
Hay Tedder.
No. 93,805.
Patented Aug. 17, 1869.
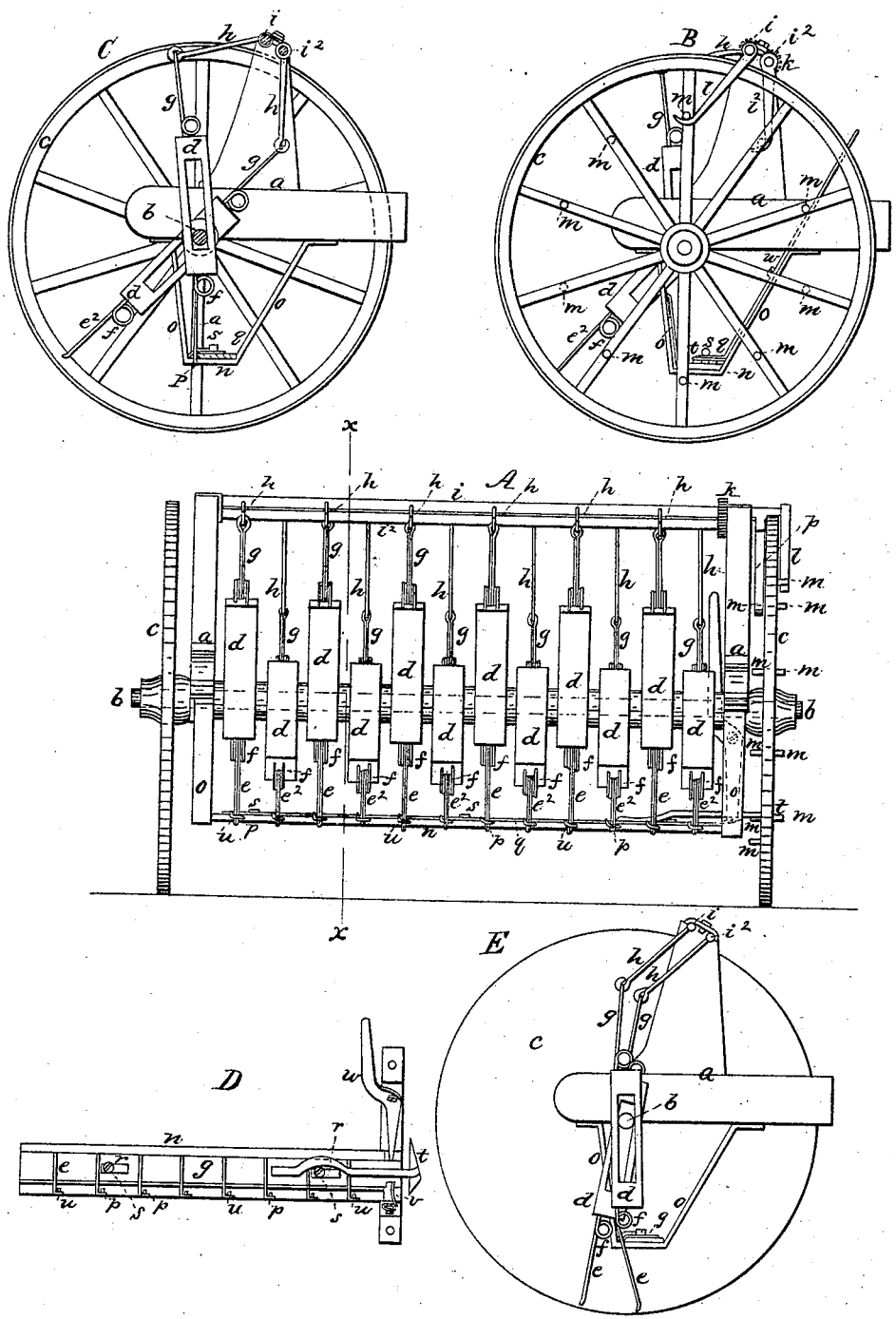
Witnesses:
M. W. Frothingham
J. B. Ridder
Inventor:
A. H. Caryl
by his Atty's
Crosby Halstead & Gould

United States Patent Office.

A. H. CARYL, OF GROTON, MASSACHUSETTS.

Letters Patent No. 93,805, dated August 17, 1869.

---

HAY-TEDDER.

---

The Schedule referred to in these Letters Patent and making part of the same.

---

To all whom it may concern:

Be it known that I, A. H. CARYL, of Groton, in the county of Middlesex, and State of Massachusetts, have invented an Improved Hay-Tedder; and I do hereby declare that the following, taken in connection with the drawings which accompany and form part of this specification, is a description of my invention, sufficient to enable those skilled in the art to practise it.

The organization of the various hay-making machines, (or machines for tedding or spreading hay in process of curing,) which are now or have been in use, are pretty well understood by constructors of agricultural implements.

The principal machines which have been practically used, are the "Brown rotary tedder," (having several series of revolving teeth,) the "Bullard tedder," in which a single series of teeth is used, (these teeth having an eccentric up-and-down forward-and-back movement imparted to them,) and the "American hay-tedder," made under the "Garfield" patent, (in which, as in the "Brown tedder," several series of revolving teeth, or forks are used, the teeth of each of which series, however, have movements in excess of or eccentrically to their revolving movement.)

My machine differs essentially in its organization from each and all of these, as it also does from all other hay-tedding machines heretofore made, in that I use one or more series of reciprocating teeth, which not only move down to take the hay, rearward with the hay, up from the hay, and forward to come into position to again move down to take the hay, but in that in moving down, each tooth completes its downward movement before being thrown to the rear, and is held back while tension is produced upon it by movement of its stock, so that when released it springs rearward with a bound, and flirts the hay back from it, in contradistinction to the positive and measured movement of the teeth of the "Brown," "Bullard," and "Garfield" tedders, in which the only possible spring-movement in the teeth or forks is due to their points catching against the ground and springing back as they rise from the ground.

This spring-movement of the tedder-teeth in my machine, produced as it is by positively holding back the points of the teeth until the desired tension is produced, and until they are in position (vertically) to best act upon the hay, and then releasing them, (when thus in position to throw the hay,) gives them an obvious advantage unattainable in the other machines to which reference has been made.

It is in the organization of the machine for effecting the movements of the tedder-teeth or springs that my invention primarily consists.

The drawings represent a machine embodying the invention.

A shows the machine in rear elevation;
B is an end view of it; and
C, a vertical section on the line $x\,x$.

$a$ denotes a carriage-frame, whose axle, $b$, is mounted upon the wheels $c\,c$.

This axle or shaft extends across the frame, and upon it is placed a series of sliding stocks, $d$, each of which has a long slot, through which the axle extends, and by which the stock can slide freely upon the axle in the direction of the length of the stock.

To the lower end of each slotted stock is fixed a long spring-tooth, $e$, (preferably formed with a coil, $f$,) and the upper end of the stock is hung by a spring, $g$, to a rod, $h$, projecting from a rocker-shaft, $i$, which turns in suitable bearings on the frame $a$.

Two sets of toothed stocks are shown in the drawings, they being upon the same shaft or axle $b$, the respective or alternate teeth being marked $e\,e^2$, and the teeth of one set being connected to a rocker-shaft, $i$, and the alternate teeth to a similar shaft, $i^2$, these two shafts being geared together, as seen at $k$.

On the outer end of each rocker-shaft is fixed an arm, $l$ or $l^2$, one projecting down upon one side of the adjacent wheel $c$, and the other upon the opposite side thereof, as seen at A, the arms hanging in the paths of pins $m$, projecting laterally from the respective sides of the spokes of the wheels $c$.

As the wheels rotate, and when one of the pins $m$ strikes either arm $l$ or $l^2$, the arm is moved inward, and thereby turns the shaft $i$ or $i^2$, to which the arm is fixed, this movement of the shaft throwing its rods $h$ forward, or inward, thus drawing inward the upper ends of the stocks $d$, and throwing outward their lower ends, and the tedder-springs fixed thereto, the rotative movement of the rods $h$ bringing them from inclined toward a vertical position, and thereby sliding down the stocks $d$ upon the shaft $b$, thus effecting a downward and outward movement of one series of the tedder-springs.

As the other rocker-shaft is geared directly to the shaft thus moved, a rotative movement is imparted thereto, (in the opposite direction,) which movement carries its rods $h$ outward, throwing the upper ends of its stocks $d$ outward, and their lower ends inward, at the same time lifting the stocks and their tedder-springs, thus giving to the springs an upward and inward movement, the forks of one set being thus moved down in front of and outward with the hay, while those of the other set are moved up over the hay, and inward into position to again drop down to take fresh hay.

Instead, however, of giving a free or unobstructed movement to the tedder-teeth in this manner, I hold the teeth back, by virtue of the springs $e\,g$, while the slotted stocks are dropping, and during the first part of the outward movement of the lower ends of the stock, so that when finally released, they shall spring out with the hay and toss or flirt the hay from them.

This stoppage and release of the springs is effected as follows:

A short distance above the plane of the tread of the wheels, a horizontal bar, *n*, stretches across the machine between two hangers, *o*, depending from the frame *a*. In the outer edge of this bar is a series of notches, *p*, one opposite to each tedder-spring or tooth. Upon the top of the bar lies a sliding plate, *q*, having oblong slots, *r*, through which project screw-pins, *s*. Fixed to and connected with one end of this plate is an incline, *t*, which projects out into the path of rotation of the spokes of the adjacent wheel. Opposite to each notch *p* the shank of a hook, *u*, is fixed to the plate *q*, each hook, as the plate is slid in one direction, being carried across the front of the notch, and as the plate is slid in the opposite direction, being carried to one side of the notch. As each spoke of the wheel strikes the incline *t*, the hook-plate is pushed back, carrying the hooks away from the notches, and as the spoke passes the incline, the plate is carried forward by a suitable spring, *r*, bringing each hook in front of its notch.

The operation of the hooks is as follows:

Just before, or just as either arm $l\,l^2$ is struck by a pin, *m*, a spoke strikes the incline *t*, and slides back the plate *q*. As the arm is moved by the pin, the upward and outward movement of the upper ends of one set of the stocks produced thereby, throws back the tedder-springs of such stocks, and each spring enters the notch *p* in the bar in line with it. As the spoke passes by the incline, the spring *r* draws forward the plate, and fastens all the tedder-springs which entered the notches. In this position they are held by the hooks while they complete their ascent and while they next descend, and while the arms $l\,l^2$, to which their stocks *d* are attached by the springs, are moved inward, the springs *e g* yielding under the strain produced by the movement of the arms $l\,l^2$, and the teeth being kept in this position under tension until the plate is again slid back, it will readily be seen that when they are released from the hooks they will spring forward with a bound, the whole, or a material part of their forward movement being comprised in this spring, and their movement thus produced effectually tossing and turning the hay.

The tedder-teeth or springs are peculiar in their construction. Instead of making a fork, the two tines of which spring from two coils united by a cross-wire, which forms the loop, by which the fork is secured in position, I make each tooth of a double wire, springing from a coil, the two ends of the wire forming or springing from the outer ends of the coil, and being driven into the stock. The two parts of the wire forming the tooth lie close together, and the teeth are thus made very strong and enduring, and easy of attachment.

The springs that connect the upper ends of the slotted stocks to the rocker-shaft rods may be similarly made, the outer end or fold of the spring being opened to form a loop, as seen at A.

By means of a lever, *w*, the tooth-plate may be slid back far enough to remove the incline from the path of movement of the pins *m*, so as to throw the hooks out of action whenever necessary or desirable.

It will be seen that if any one of the tedder-teeth meets an obstruction, the arrangement of its stock upon the shaft *b*, and the connection of the spring *g*, enables the tooth to yield to any extent necessary to free it.

1. I claim a tedder-machine, so organized that the tedder-teeth are positively held back under tension between their tips and the stocks to which they are affixed, while their stocks move forward, and are then released, thereby imparting a jerking movement to flirt the hay, substantially as described.

2. I also claim the combination of the slotted sliding stocks *d*, spring-teeth *e*, springs *g*, and rods *h*, and rocker-shafts *i*, arranged and operating together, substantially as described.

3. Also, in combination with the spring-teeth *e* and the mechanism for imparting their positive movements, the hooks *u*, or equivalent devices, operating to first hold back and then release the tedder-springs, substantially as described.

4. The combination, with the carriage-wheel, of the incline and its spring, for actuating the hook-plate, and the arms $l\,l^2$, and pinions, for actuating the rocker-shafts, substantially as described.

A. H. CARYL.

Witnesses:
J. B. CROSBY,
FRANCIS GOULD.